(12) United States Patent
Yoon et al.

(10) Patent No.: US 11,023,065 B2
(45) Date of Patent: Jun. 1, 2021

(54) TOUCH SENSOR

(71) Applicant: HiDeep Inc., Gyeonggi-do (KR)

(72) Inventors: Sang Sic Yoon, Gyeonggi-do (KR); Bon Kee Kim, Seoul (KR)

(73) Assignee: HIDEEP INC., Gyeonggi-Do (KR)

( * ) Notice: Subject to any disclaimer, the term of this patent is extended or adjusted under 35 U.S.C. 154(b) by 0 days.

(21) Appl. No.: 15/293,415

(22) Filed: Oct. 14, 2016

(65) Prior Publication Data

US 2017/0031509 A1 Feb. 2, 2017

Related U.S. Application Data

(63) Continuation of application No. 14/908,706, filed as application No. PCT/KR2014/006907 on Jul. 29, 2014, now abandoned.

(30) Foreign Application Priority Data

Jul. 29, 2013 (KR) .......................... 10-2013-0089516

(51) Int. Cl.
   *G06F 3/041* (2006.01)
   *G06F 3/044* (2006.01)
   *G06F 3/047* (2006.01)
(52) U.S. Cl.
   CPC ............ *G06F 3/0416* (2013.01); *G06F 3/047* (2013.01); *G06F 3/0412* (2013.01); *G06F 3/0445* (2019.05); *G06F 2203/04105* (2013.01)
(58) Field of Classification Search
   CPC ................... G06F 3/0414; G06F 3/044; G06F 2203/04103; G06F 2203/04105
   (Continued)

(56) References Cited

U.S. PATENT DOCUMENTS 5,510,813 A    4/1996  Makinwa et al.
6,002,389 A *  12/1999 Kasser .................... G06F 3/041
                                                    178/18.01
(Continued)

FOREIGN PATENT DOCUMENTS

CN    102279687    12/2011
CN    103221911    7/2013
(Continued)

OTHER PUBLICATIONS

International Search Report for Corresponding Application No. PCT/KR2014/006907, dated Nov. 28, 2014.
(Continued)

*Primary Examiner* — Yuzhen Shen
(74) *Attorney, Agent, or Firm* — The Belles Group, P.C.

(57) ABSTRACT

In one embodiment, a touch sensor includes a first electrode, a second electrode, and a spacer layer located between the first electrode and the second electrode. One of the first electrode and the second electrode is a drive electrode to which a drive signal is applied. The other one of the first electrode and the second electrode is a receiving electrode that receives the drive signal by a mutual capacitance between the first electrode and the second electrode. When an external pressure is applied to the first electrode through a display, the first electrode is concavely bent toward the second electrode. The mutual capacitance between the first electrode and the second electrode changes according to a distance between the first electrode and the second electrode. The magnitude of the external pressure according to the change of the capacitance between the first electrode and the second electrode is detected.

12 Claims, 10 Drawing Sheets

(58) Field of Classification Search
USPC .................................................. 345/174
See application file for complete search history.

(56) References Cited

U.S. PATENT DOCUMENTS

| | | | |
|---|---|---|---|
| 8,089,470 | B1 | 1/2012 | Schediwy |
| 9,201,105 | B2 | 12/2015 | Lida et al. |
| 9,542,031 | B2* | 1/2017 | Shibata .................. G06F 3/044 |
| 2003/0007238 | A1 | 1/2003 | Liang et al. |
| 2004/0227736 | A1 | 11/2004 | Kamrath et al. |
| 2005/0253821 | A1 | 11/2005 | Roeder |
| 2006/0033721 | A1 | 2/2006 | Woolley |
| 2006/0138574 | A1* | 6/2006 | Saito ...................... G01L 1/146 |
| | | | 257/417 |
| 2006/0146033 | A1 | 7/2006 | Chen et al. |
| 2007/0030255 | A1 | 2/2007 | Pak et al. |
| 2007/0085837 | A1* | 4/2007 | Ricks ................. G02F 1/13338 |
| | | | 345/173 |
| 2007/0159561 | A1 | 7/2007 | Chien |
| 2007/0291014 | A1 | 12/2007 | Layton |
| 2008/0062139 | A1 | 3/2008 | Hotelling et al. |
| 2008/0062140 | A1 | 3/2008 | Hotelling et al. |
| 2008/0202251 | A1 | 8/2008 | Serban et al. |
| 2009/0046068 | A1 | 2/2009 | Griffin |
| 2009/0135161 | A1 | 5/2009 | Endo |
| 2009/0160822 | A1 | 6/2009 | Eguchi et al. |
| 2009/0316380 | A1 | 12/2009 | Armstrong |
| 2010/0024573 | A1* | 2/2010 | Daverman .............. G01L 1/142 |
| | | | 73/862.626 |
| 2010/0033354 | A1* | 2/2010 | Ejlersen ................ H03K 17/98 |
| | | | 341/33 |
| 2010/0107770 | A1* | 5/2010 | Serban .................... G01L 1/142 |
| | | | 73/718 |
| 2010/0123672 | A1 | 5/2010 | Kim et al. |
| 2010/0149129 | A1 | 6/2010 | Homma et al. |
| 2010/0253643 | A1 | 10/2010 | McKay |
| 2010/0253645 | A1 | 10/2010 | Bolender |
| 2010/0309030 | A1 | 12/2010 | Huang et al. |
| 2010/0321609 | A1 | 12/2010 | Qi et al. |
| 2011/0012869 | A1 | 1/2011 | Klinghult |
| 2011/0023631 | A1 | 2/2011 | Sleeman |
| 2011/0023634 | A1 | 2/2011 | Carkner |
| 2011/0037726 | A1 | 2/2011 | Lee |
| 2011/0057880 | A1 | 3/2011 | Kasahara |
| 2011/0057899 | A1* | 3/2011 | Sleeman .................. G01L 1/146 |
| | | | 345/174 |
| 2011/0080373 | A1 | 4/2011 | Wang et al. |
| 2011/0084985 | A1 | 4/2011 | Kojima |
| 2011/0096025 | A1 | 4/2011 | Slobodin et al. |
| 2011/0115738 | A1 | 5/2011 | Suzuki et al. |
| 2011/0126900 | A1 | 6/2011 | Inoue et al. |
| 2011/0157087 | A1 | 6/2011 | Kanehira et al. |
| 2011/0175845 | A1 | 7/2011 | Honda et al. |
| 2011/0267284 | A1 | 11/2011 | Lee et al. |
| 2011/0298479 | A1 | 12/2011 | Matsushima |
| 2011/0310053 | A1* | 12/2011 | Kim ........................ C08K 5/41 |
| | | | 345/174 |
| 2012/0038583 | A1* | 2/2012 | Westhues ............. G06F 3/0412 |
| | | | 345/174 |
| 2012/0044266 | A1 | 2/2012 | Mori |
| 2012/0050195 | A1 | 3/2012 | Heo et al. |
| 2012/0068965 | A1 | 3/2012 | Wada et al. |
| 2012/0074961 | A1 | 3/2012 | Herrmann |
| 2012/0105340 | A1 | 5/2012 | Beom et al. |
| 2012/0113361 | A1 | 5/2012 | Huang et al. |
| 2012/0127095 | A1 | 5/2012 | Jun |
| 2012/0144981 | A1* | 6/2012 | Ciccone ............... G01D 5/2417 |
| | | | 84/746 |
| 2012/0147052 | A1 | 6/2012 | Homma |
| 2012/0180575 | A1 | 7/2012 | Sakano et al. |
| 2012/0182261 | A1 | 7/2012 | Wang et al. |
| 2012/0206664 | A1 | 8/2012 | Brown |
| 2012/0242635 | A1 | 9/2012 | Erhart et al. |
| 2012/0319966 | A1 | 12/2012 | Reynolds |
| 2013/0009653 | A1* | 1/2013 | Fukushima ............. G06F 3/044 |
| | | | 324/679 |
| 2013/0016059 | A1 | 1/2013 | Lowles et al. |
| 2013/0016060 | A1 | 1/2013 | Pereverzev et al. |
| 2013/0018059 | A1 | 1/2013 | Jacob et al. |
| 2013/0033450 | A1 | 2/2013 | Coulson et al. |
| 2013/0106780 | A1 | 5/2013 | Hotelling et al. |
| 2013/0208291 | A1 | 8/2013 | Ikeda |
| 2013/0234734 | A1* | 9/2013 | Iida ........................ G06F 3/044 |
| | | | 324/661 |
| 2013/0234977 | A1 | 9/2013 | Lin |
| 2013/0241873 | A1 | 9/2013 | Kim et al. |
| 2013/0249859 | A1 | 9/2013 | Park et al. |
| 2013/0257784 | A1 | 10/2013 | Vandermeijden et al. |
| 2014/0002113 | A1 | 1/2014 | Schediwy et al. |
| 2014/0028616 | A1 | 1/2014 | Furutani et al. |
| 2014/0049506 | A1 | 2/2014 | Lin |
| 2014/0062934 | A1 | 3/2014 | Coulson et al. |
| 2014/0078080 | A1 | 3/2014 | Kim et al. |
| 2014/0111953 | A1 | 4/2014 | McClure et al. |
| 2014/0204049 | A1 | 7/2014 | Tsai et al. |
| 2014/0204285 | A1* | 7/2014 | Jang ........................ G06F 3/044 |
| | | | 349/12 |
| 2014/0210791 | A1 | 7/2014 | Hanauer et al. |
| 2014/0267128 | A1 | 9/2014 | Bulea et al. |
| 2014/0267134 | A1 | 9/2014 | Bulea et al. |
| 2014/0307186 | A1 | 10/2014 | Yun et al. |
| 2015/0009432 | A1 | 1/2015 | Katagiri |
| 2015/0076531 | A1 | 3/2015 | Kim |
| 2015/0097802 | A1 | 4/2015 | Kim et al. |
| 2015/0168767 | A1 | 6/2015 | Yonemura |
| 2015/0169121 | A1 | 6/2015 | Yao et al. |
| 2015/0212633 | A1 | 7/2015 | Yamagishi et al. |
| 2015/0235607 | A1 | 8/2015 | Nakanishi et al. |
| 2015/0301660 | A1 | 10/2015 | Watazu |
| 2015/0355771 | A1 | 12/2015 | Watazu et al. |
| 2015/0370373 | A1 | 12/2015 | Barel |
| 2016/0034087 | A1 | 2/2016 | Kim et al. |
| 2016/0035290 | A1 | 2/2016 | Kim et al. |
| 2016/0062500 | A1 | 3/2016 | Kessler et al. |
| 2016/0085336 | A1 | 3/2016 | Kim et al. |
| 2016/0088133 | A1 | 3/2016 | Kim et al. |
| 2016/0188082 | A1* | 6/2016 | Ham ...................... G06F 3/0416 |
| | | | 345/174 |
| 2016/0209984 | A1 | 7/2016 | Richards |

FOREIGN PATENT DOCUMENTS

| | | |
|---|---|---|
| CN | 103257779 | 8/2013 |
| CN | 203386194 | 1/2014 |
| JP | 2007048275 | 2/2007 |
| JP | 2007322587 | 12/2007 |
| JP | 2009163363 | 7/2009 |
| JP | 2010033382 | 2/2010 |
| JP | 2010108501 | 5/2010 |
| JP | 2010140417 | 6/2010 |
| JP | 2010244514 | 10/2010 |
| JP | 2011-053831 | 3/2011 |
| JP | 2011081578 | 4/2011 |
| JP | 2011086191 | 4/2011 |
| JP | 201110364 | 5/2011 |
| JP | 2011-165023 | 8/2011 |
| JP | 2011248439 | 12/2011 |
| JP | 2011258043 | 12/2011 |
| JP | 2012-048279 | 3/2012 |
| JP | 2012084025 | 4/2012 |
| JP | 2012235224 | 11/2012 |
| JP | 2013015976 | 1/2013 |
| JP | 2013-045173 | 3/2013 |
| JP | 2013088932 | 5/2013 |
| JP | 2013105154 | 5/2013 |
| JP | 2013132736 | 7/2013 |
| JP | 2013-171369 | 9/2013 |
| JP | 2013-546050 | 12/2013 |
| JP | 2013242770 | 12/2013 |
| JP | 2014-112436 | 6/2014 |
| JP | 2014-115708 | 6/2014 |
| JP | 5567727 | 8/2014 |

(56) References Cited

FOREIGN PATENT DOCUMENTS

| | | |
|---|---|---|
| JP | 2014194591 | 10/2014 |
| JP | WO2013132736 | 7/2015 |
| JP | 5798700 | 10/2015 |
| KR | 1020090068165 | 6/2009 |
| KR | 200900776126 | 7/2009 |
| KR | 20100025176 | 3/2010 |
| KR | 1020110022727 | 3/2011 |
| KR | 20110039304 | 4/2011 |
| KR | 1033154 | 5/2011 |
| KR | 1020110128724 | 11/2011 |
| KR | 20120053716 | 5/2012 |
| KR | 20120139518 | 12/2012 |
| KR | 101311235 | 9/2013 |
| KR | 1020130127176 | 11/2013 |
| KR | 20130131647 | 12/2013 |
| KR | 20140080596 | 7/2014 |
| KR | 1020140096905 | 8/2014 |
| KR | 20150011271 | 1/2015 |
| KR | 101506511 | 4/2015 |
| TW | 201347006 | 11/2013 |
| WO | WO 2010/115131 | 10/2010 |
| WO | WO2011013588 | 2/2011 |
| WO | WO2011111906 | 9/2011 |
| WO | 2013/028538 | 2/2013 |
| WO | WO2013140975 | 9/2013 |
| WO | WO2014017248 | 1/2014 |
| WO | WO2014080924 | 5/2014 |
| WO | WO2013129092 | 7/2015 |
| WO | WO2013132736 | 7/2015 |
| WO | WO2015106183 | 7/2015 |
| WO | WO2014141584 | 2/2017 |

OTHER PUBLICATIONS

Corresponding Search Report Issued by the EPO dated Aug. 27, 2015.
Corresponding Office Action Issued by the KIPO dated Oct. 19, 2015.
Corresponding Office Action Issued by the JPO dated Jul. 14, 2015.
Corresponding Office Action Issued by the KIPO dated Sep. 30, 2015.
Corresponding Office Action Issued by the JPO dated Jul. 28, 2015.
Corresponding Office Action Issued by the KIPO dated Sep. 23, 2015.
Corresponding Office Action Issued by JPO dated Aug. 25, 2015.
Corresponding U.S. Appl. No. 14/992,568, filed Jan. 11, 2016.
Corresponding U.S. Appl. No. 15/007,240, filed Jan. 27, 2016.
Corresponding U.S. Appl. No. 15/009,951, filed Jan. 29, 2016.
Corresponding U.S. Appl. No. 14/992,668, filed Jan. 11, 2016.
Corresponding U.S. Appl. No. 15/007,245, filed Jan. 27, 2016.
Corresponding U.S. Appl. No. 15/009,973, filed Jan. 29, 2016.
Corresponding U.S. Appl. No. 14/820,942, filed Aug. 7, 2015.
Corresponding U.S. Appl. No. 14/908,706, filed Jan. 29, 2016.
Corresponding U.S. Appl. No. 15/071,561, filed Mar. 16, 2016.
Corresponding Office Action issued by the SIPO dated Nov. 30, 2017.
Japanese Office Action issued in Japanese Application No. 2017-036310 dated Dec. 3, 2019.
Office Action issued in Corresponding Indian Application No. 201747006997, dated Jun. 25, 2020.
Office Action issued in Corresponding Indian Application No.201747013522, dated Jul. 17, 2020.
Goel et al, "GripSense: Using Built-In Sensors to Detect Hand Posture and Pressure on Commodity Mobile Phones," pp. 545-554, Oct. 2012.
Geoff Walker, "Part I: Fundamentals of Projected-Capacitive Touch Technology," Jun. 1, 2014.
Chokri Cherif et al., "Textile Werkstoffe fur den Leichtbau," Jan. 1, 2011, Textile Werstoffe f?r den Leichtbau, Dresden, doi:10.1007/978-3-642-17992-1, ISBN 978-3-642-17991-4, (20110101), URL: http://www.corning.com/media/worldwide/cdt/documents/Flexible_glass_substrates_for_continuo us_manufacturing.pdf.

* cited by examiner

TOUCH SENSOR

CROSS-REFERENCE TO RELATED APPLICATIONS

The present application is a continuation of U.S. patent application Ser. No. 14/908,706, filed Jan. 29, 2016, which is a national stage application, under 35 U.S.C. § 371, to international patent application No. PCT/KR2014/006907, filed Jul. 29, 2014, which claims priority to Korean Patent Application No. 10-2013-0089516, filed Jul. 29, 2013. The disclosures of the aforementioned priority applications are incorporated herein by reference in their entirety.

TECHNICAL FIELD

Embodiments may relate to a touch sensor panel, and more particularly to a touch sensor panel capable of sensing not only a touch on the touch sensor panel and a position of the touch but also a magnitude of a pressure of the touch through capacitance change, a touch detection device for the same, and a touch input device including the both.

BACKGROUND ART

A variety of input devices are now being used for the operation of a computing system. For example, the input device includes a button, a key, a joystick and a touch screen. Thanks to an easy and simple operation of the touch screen, the touch screen is now increasingly used in the operation of the computing system.

The touch screen may include a touch sensor panel which is a transparent panel and has a touch-sensitive surface. The touch sensor panel is attached to the entire surface of a display screen, so that the touch-sensitive surface may cover the visible side of the display screen. The touch screen allows a user to simply touch the display screen with user's finger, etc., and to operate the computing system. Generally, the touch screen can recognize the touch on the display screen and a position of the touch, and then the computing system analyzes the touch and performs operations according to the analysis.

Here, there is a requirement for a touch sensor panel capable of sensing not only the touch on the display screen and the touch position but also a magnitude of a pressure from the touch by sensing capacitance change caused by the touch on the display screen.

DISCLOSURE

Technical Problem

An object of the present invention is to provide a touch sensor panel capable of sensing not only a touch on a surface of the touch sensor panel and a position of the touch but also a magnitude of a pressure of the touch, a touch detection device for the same, and a touch input device including the both.

Also, another object of the present invention is to provide a touch sensor panel capable of sensing not only a touch on the touch sensor panel and a position of the touch but also a magnitude of a pressure of the touch by sensing capacitance change, a touch detection device for the same, and a touch input device including the both.

Technical Solution

One embodiment is a touch sensor including: a first electrode; a second electrode; and a spacer layer located between the first electrode and the second electrode. At least one of the first electrode and the second electrode comprises a plurality of electrodes. The first electrode and the second electrode are spaced apart from each other by a predetermined distance. One of the first electrode and the second electrode is a drive electrode to which a drive signal is applied. The other one of the first electrode and the second electrode is a receiving electrode that receives the drive signal by a mutual capacitance between the first electrode and the second electrode. When an external pressure is applied to the first electrode through a display provided on one side of the first electrode opposite to the second electrode, the first electrode is concavely bent toward the second electrode in response to the external pressure. The mutual capacitance between the first electrode and the second electrode changes according to a distance between the first electrode and the second electrode. The magnitude of the external pressure according to the change of the capacitance between the first electrode and the second electrode is detected.

Another embodiment is a touch sensor including: a first electrode; a reference potential layer; and a spacer layer located between the first electrode and the reference potential layer. The first electrode and the reference potential layer are overlapped with each other. The spacer layer is formed by a support member disposed on edge portions of the reference potential layer. The first electrode and the reference potential layer are spaced apart from each other by a predetermined distance at rest portions of the reference potential layer. When an external pressure is applied to the first electrode through a display provided on one side of the first electrode opposite to the reference potential layer, the first electrode is concavely bent toward the reference potential layer in response to the external pressure. The capacitance between the first electrode and the reference potential layer changes according to a distance between the first electrode and the reference potential layer. The magnitude of the external pressure according to the change of the capacitance between the first electrode and the reference potential layer is detected.

Also, further another embodiment is a touch sensor including: a reference potential layer; a second electrode; and a spacer layer located between the reference potential layer and the second electrode. The reference potential layer and the second electrode are overlapped with each other. The spacer layer is formed by a support member disposed on edge portions of the second electrode layer. The reference potential layer and the second electrode are spaced apart from each other by a predetermined distance at rest portions of the second electrode. When an external pressure is applied to the reference potential layer through a display provided on one side of the reference potential layer opposite to the second electrode, the reference potential layer is concavely bent toward the second electrode in response to the external pressure. The capacitance between the reference potential layer and the second electrode changes according to a distance between the reference potential layer and the second electrode. The magnitude of the external pressure according to the change of the capacitance between the reference potential layer and the second electrode is detected.

Advantageous Effects

According to the embodiment of the present invention, it is possible to provide a touch sensor panel capable of sensing not only a touch on a surface of the touch sensor panel and a position of the touch but also a magnitude of a pressure of the touch, a touch detection device for the same, and a touch input device including the both.

Also, according to the embodiment of the present invention, it is possible to provide a touch sensor panel capable of sensing not only a touch on the touch sensor panel and a position of the touch but also a magnitude of a pressure of the touch by sensing capacitance change, a touch detection device for the same, and a touch input device including the both.

DESCRIPTION OF DRAWINGS

FIG. 4b shows separately the pattern of the first electrode shown in FIG. 4a;

FIG. 4c shows separately the pattern of the second electrode shown in FIG. 4a;

FIG. 4d is an enlarged view of a part "A" of FIG. 4a;

FIG. 5b shows separately the patterns of the second and third electrodes shown in FIG. 5a;

FIG. 7b shows separately the pattern of the second electrode of FIG. 7a; and

FIG. 7c shows separately the pattern of the third electrode of FIG. 7a.

MODE FOR INVENTION

Figure 1:
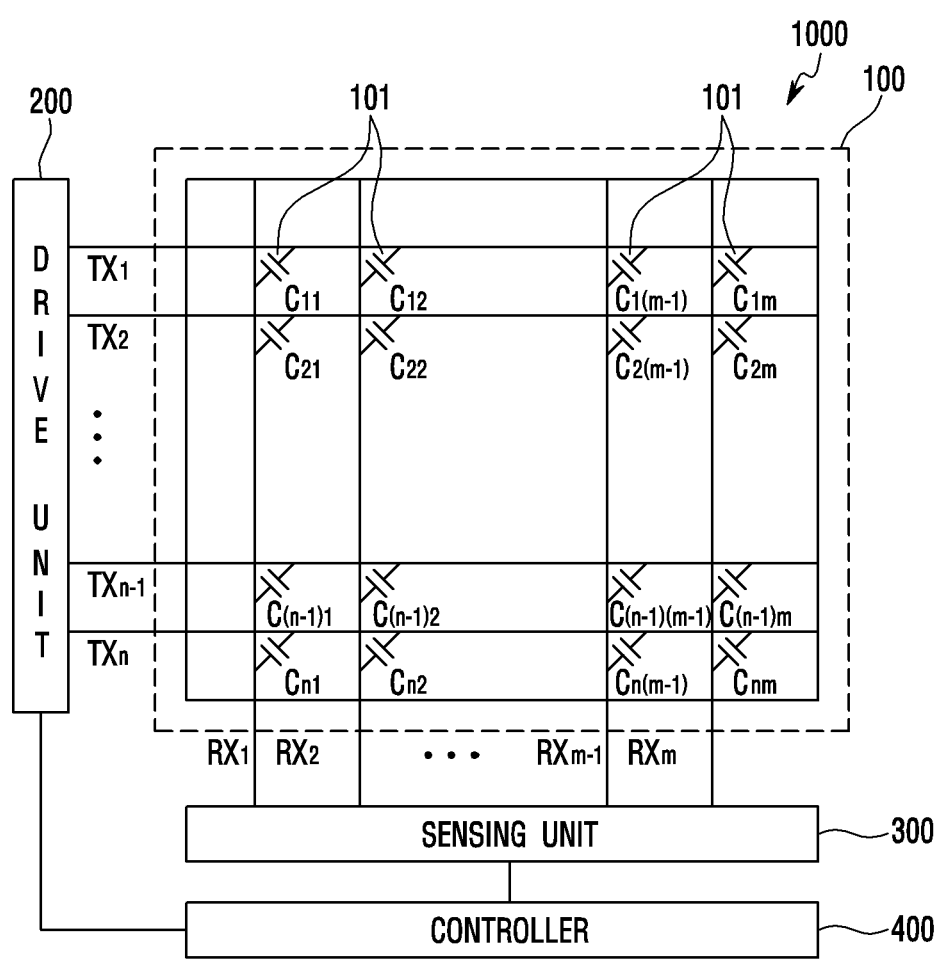
FIG. 1 is a schematic view of a capacitive touch input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a capacitive touch sensor panel, a touch detection device and a touch input device including the both in accordance with embodiments of the present invention will be described with reference to the accompanying drawings.

FIG. 1 is a schematic view of a capacitive touch input device according to the embodiment of the present invention. Referring to FIG. 1, the touch input device 1000 according to the embodiment of the present invention may include a touch sensor panel 100 including a plurality of drive electrodes TX1 to TXn and a plurality of receiving electrodes RX1 to RXm, and may include a drive unit 200 which applies a drive signal to the plurality of drive electrodes TX1 to TXn, and a sensing unit 300 which detects a touch, a touch position and/or a magnitude of a pressure of the touch by receiving a sensing signal including information on a capacitance change amount changing according to the touch on a touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may be formed to include at least any one of silver ink, copper or carbon nanotube (CNT). Also, the drive electrode TX and the receiving electrode RX may be made of metal mesh or nano silver.

The drive unit 200 according to the embodiment of the present invention may apply a driving signal to the drive electrodes TX1 to TXn. In the touch input device 1000 according to the embodiment of the present invention, one driving signal may be sequentially applied at a time to the first drive electrode TX1 to the n-th drive electrode TXn. The driving signal may be applied again repeatedly. This is just an example. The driving signal may be applied to the plurality of drive electrodes at the same time in accordance with the embodiment.

Through the receiving electrodes RX1 to RXm, the sensing unit 300 receives the sensing signal including information on a capacitance (Cm) 101 generated between the receiving electrodes RX1 to RXm and the drive electrodes TX1 to TXn to which the driving signal has been applied, thereby detecting whether or not the touch has occurred, the touch position and/or the magnitude of the touch pressure. For example, the sensing signal may be a signal coupled by the capacitance (CM) 101 generated between the receiving electrode RX and the drive electrode TX to which the driving signal has been applied. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 300 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. Here, the positive (+) input terminal of the amplifier may be connected to the ground. Also, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into a voltage. The sensing unit 300 may further include an analog to digital converter (ADC) (not shown) which converts the integrated data by the receiver into digital data. Later, the digital data may be input to a processor (not shown) and processed to obtain information on the touch on the touch sensor panel 100. The sensing unit 300 may include the ADC and processor as well as the receiver.

A controller 400 may perform a function of controlling the operations of the drive unit 200 and the sensing unit 300. For example, the controller 400 generates and transmits a drive control signal to the drive unit 200, so that the driving signal can be applied to a predetermined drive electrode TX1 at a predetermined time. Also, the controller 400 generates and transmits the drive control signal to the sensing unit 300, so that the sensing unit 300 may receive the sensing signal from the predetermined receiving electrode RX at a predetermined time and perform a predetermined function.

In FIG. 1, the drive unit 200 and the sensing unit 300 may constitute a touch detection device (not shown) capable of detecting whether or not the touch has occurred on the touch sensor panel 100 according to the embodiment of the present invention, the touch position and/or the touch pressure. The touch detection device according to the embodiment of the present invention may further include the controller 400. The touch detection device according to the embodiment of the present invention may be integrated and implemented on a touch sensing integrated circuit (IC) in the touch input device 1000 including the touch sensor panel 100. The drive electrode TX and the receiving electrode RX included in the touch sensor panel 100 may be connected to the drive unit 200 and the sensing unit 300 included in touch sensing IC through, for example, a conductive trace and/or a conductive pattern printed on a circuit board, or the like.

As described above, a capacitance (C) with a predetermined value is generated at each crossing of the drive electrode TX and the receiving electrode RX. When an object like a finger approaches close to the touch sensor panel 100, the value of the capacitance may be changed. In FIG. 1, the capacitance may represent a mutual capacitance (Cm). The sensing unit 300 senses such electrical characteristics, thereby sensing whether the touch has occurred on the touch sensor panel 100 or not and where the touch has occurred. For example, the sensing unit 110 is able to sense whether the touch has occurred on the surface of the touch sensor panel 100 comprised of a 2-dimensional plane consisting of a first axis and a second axis.

More specifically, when the touch occurs on the touch sensor panel 100, the drive electrode TX to which the driving signal has been applied is detected, so that the position of the second axial direction of the touch can be detected. Likewise, when the touch occurs on the touch sensor panel 100, the change of the capacitance is detected from the reception signal received through the receiving electrode RX, so that the position of the first axial direction of the touch can be detected.

In the foregoing, it has been described that whether or not the touch occurs on the touch sensor panel 100 according to the embodiment of the present invention and/or the touch position are detected. Additionally, as described above, through use of the touch sensor panel 100 according to the embodiment of the present, it is possible to detect the magnitude of the touch pressure together with or separately from whether the touch has occurred or not and/or the touch position. A principle of detecting the magnitude of the pressure of the touch on the touch sensor panel 100 in the touch input device 1000 according to the embodiment of the present invention will be described in detail with regard to FIGS. 2 to 4.

Figure 2:
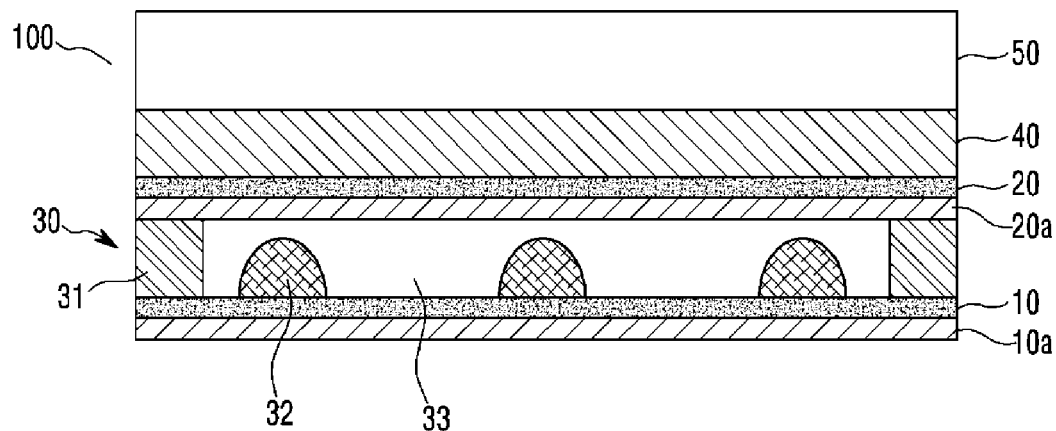
FIG. 2 is a cross sectional view of a capacitive touch sensor panel according to a first embodiment of the present invention.

FIG. 2 is a cross sectional view of a capacitive touch sensor panel according to a first embodiment of the present invention. As shown in FIG. 2, the capacitive touch sensor panel according to the first embodiment of the present invention may include a plurality of first electrodes 10 formed on a first insulation layer 10*a*, a plurality of second electrodes 20 formed on a second insulation layer 20*a*, and a spacer 30 which leaves a space between the first electrode 10 and the second electrode 20. One of the first electrode 10 and the second electrode 20 may be the drive electrode TX which has been described with reference to FIG. 1, and the other may be the receiving electrode RX.

The touch sensor panel according to the embodiment of the present invention may convert the change of the capacitance between the first electrode 10 and the second electrode 20 into an appropriate electrical signal and output.

Here, as shown in FIG. 2, the first electrode 10 may be arranged on the first insulation layer 10*a*, and the second electrode 20 may be arranged on the second insulation layer 20*a*. The first electrode 10 and the second electrode 20 may be arranged in the same direction relatively with respect to the first insulation layer 10*a* and the second insulation layer 20*a* respectively. The first insulation layer 10*a* and/or the second insulation layer 20*a* may be composed of a thin transparent film made of a plastic material such as polyethylene terephthalate (PET).

As shown in FIG. 2, the touch sensor panel according to the embodiment of the present invention may further include a fourth insulation layer 50 attached to the second electrode 20 by mean of an adhesive layer 40. The fourth insulation layer 50 may function as a touch surface of a user. This is just an example, and the touch surface of the touch sensor panel 100 may be any other surface capable of causing the change of the capacitance between the first electrode 10 and the second electrode 20 when the touch occurs. The touch surface may be, as described in FIG. 1, a 2-dimensional plane consisting of the first axis and the second axis. For the purpose of a normal operation of the capacitive touch sensor panel, it is preferable that the fourth insulation layer 50 should be made of a material having a uniform dielectric constant and have a uniform thickness. For example, the fourth insulation layer 50 may be made of a material like polyethylene terephthalate (PET).

The adhesive layer 40 may be made of an optical clear adhesive (OCA), resin, a pressure sensitive adhesive, or an ultraviolet light cured adhesive, in such a manner as that the second electrode 20 and the fourth insulation layer 50 are adhered to each other.

In order that it is possible to detect the magnitude of the touch pressure as well as whether the touch occurs on the touch sensor panel or not and the touch position by detecting the change of the capacitance between the first electrode 10 and the second electrode 20, the touch sensor panel 100 according to the embodiment of the present invention may include a spacer layer 30 which leaves a space between the first electrode 10 and the second insulation layer 20a.

As shown in FIG. 2, in the embodiment of the present invention, the spacer layer 30 may be formed by means of a double adhesive tape (DAT) 31 of which one side is adhered to the first electrode 10 and the other side is adhered to the second insulation layer 20a. That is, the area of the first electrode 10 and the area of the second insulation layer 20a are overlapped with each other. Here, the first electrode 10 and the second insulation layer 20a are adhered to each other by adhering the edge portions of the first electrode 10 and the second insulation layer 20a through use of the DAT 31. The rest portions of the first electrode 10 and the second insulation layer 20a may be spaced apart from each other by a predetermined distance.

In the embodiment of the present invention, the spacer layer 30 may be filled with a dielectric substance. When spacer layer 30 is filled with a dielectric substance, the optical characteristics and sensitivity characteristics thereof can be improved. When an electric field is applied to the dielectric substance, the dielectric substance does not generate direct current while generating an electric polarization. Therefore, when a voltage is applied to the first electrode 10 and the second electrode 20, a capacitance may be formed between the first electrode 10 and the second electrode 20. In the embodiment of the present invention, the dielectric substance may include open cell foam, gel or lightly linked polymer. In the embodiment of the present invention, for example, the spacer layer 30 may be filled with air.

In the embodiment of the present invention, the spacer layer 30 may be filled with an adhesive material. Here, the spacer layer 30 filled with an adhesive material not only maintains the adhesion between the first electrode 10 and the second insulation layer 20a, but functions as a dielectric substance. In the embodiment of the present invention, the adhesive material may include acrylic copolymer or silicon deformable polymer. When the spacer layer 30 is filled with the adhesive material, the double adhesive tape (DAT) 31 shown in FIG. 2 may be omitted.

As shown in FIG. 2, a plurality of dot spacers 32 may be included in the spacer layer 30. For instance, the plurality of dot spacers 32 may be formed on the first electrode 10 and may be made of a material such as nonconductive polyester. Also, the plurality of dot spacers 32 may be formed on the first insulation layer 10a without the first electrode 10 formed thereon.

Figure 3:
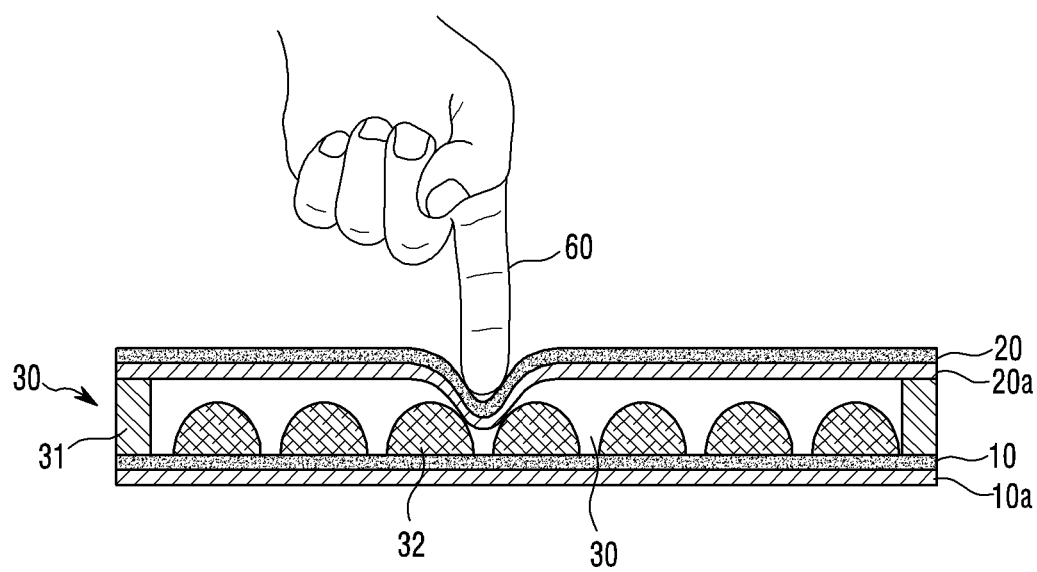
FIG. 3 shows a state where pressure is applied to the touch sensor panel according to the embodiment of the present invention.

FIG. 3 shows a state where pressure is applied to the touch sensor panel 100 according to the embodiment of the present invention. FIG. 3 shows that a touch occurs on the touch sensor panel 100 by a part of a body, etc. For brevity of description, FIG. 3 shows only the first electrode 10, the second electrode 20, the first insulation layer 10a, the second insulation layer 20a, and the spacer layer 30. In FIG. 3, an external pressure by an object touching the touch sensor panel 100 is indicated by 60.

While FIG. 3 shows that the external pressure 60 is applied to the second electrode 20, the external pressure 60 may be applied to the first electrode 10 in accordance with the embodiment. Therefore, it is necessary that at least one pair of both the first electrode 10 and the first insulation layer 10a and both the second electrode 20 and the second insulation layer 20a should have elasticity. Hereinafter, the embodiment of the present invention will be described by assuming that the external pressure 60 is applied to the second electrode 20.

As shown in FIG. 3, when the external pressure 60 is applied to the touch sensor panel 100, the second electrode 20 and the second insulation layer 20a are concavely bent toward the first electrode 10 in response to the external pressure 60. Here, in order to generate the capacitance between the second electrode 20 and the first electrode 10, it is necessary to prevent a short-circuit from occurring between the second electrode 20 and the first electrode 10. Here, in the embodiment of the present invention, the second insulation layer 20a prevents the first electrode 10 and the second electrode 20 from being short-circuited. As shown in FIG. 3, the spacer layer 30 includes the dot spacer 32, so that, when the external pressure 60 is applied to the touch sensor panel 100, the pressed area of the spacer layer 30 can be prevented from increasing, and when the external pressure 60 is removed, a restoring force by which the spacer layer 30 returns to its original shape can be improved. The size and number of the dot spacers 32 included in the spacer layer 30 may be determined in order to achieve the same purpose.

Here, the capacitance between the first electrode 10 and the second electrode 20 may change according to the change of a distance between the first electrode 10 and the second electrode 20. In the embodiment of the present invention, the magnitude of the external pressure 60 can be detected by the change of the capacitance between the first electrode 10 and the second electrode 20. In other words, the greater the external pressure 60 is, the smaller the distance between the first electrode 10 and the second electrode 20 is. As a result, the capacitance change amount may become larger. Likewise, the less the external pressure 60 is, the less the amount by which the distance between the first electrode 10 and the second electrode 20 is reduced. Here, the magnitude of the external pressure 60 may be indicated in a downward direction, that is, in a direction perpendicular and orthogonal to a horizontal plane.

Figure 4A:
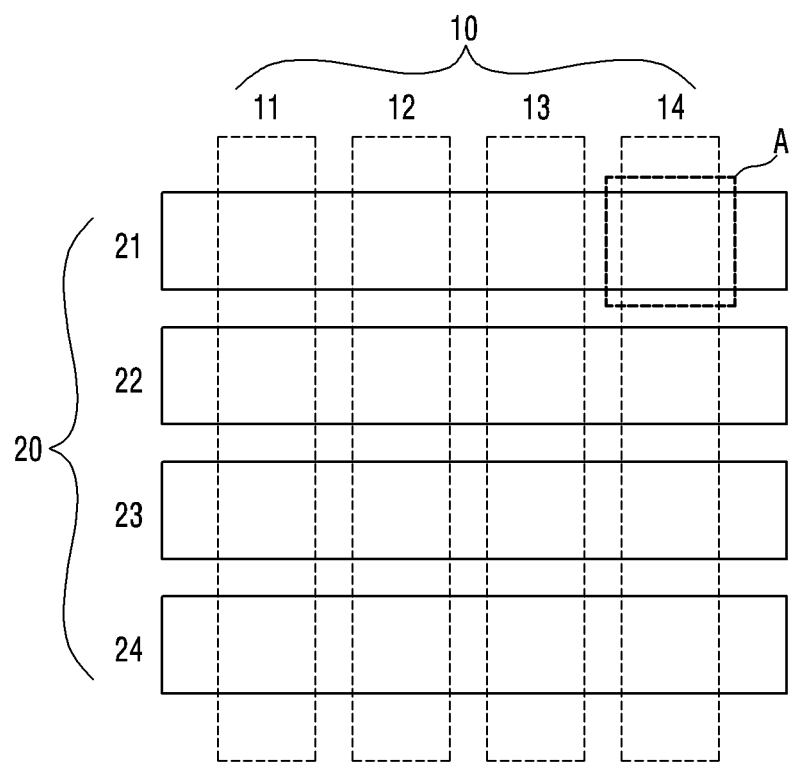
FIG. 4a shows patterns of a first electrode and a second electrode of the touch sensor panel according to the first embodiment of the present invention.

FIG. 4a shows patterns of the first electrode and the second electrode of the touch sensor panel according to the first embodiment of the present invention. The touch sensor panel according to the first embodiment of the present invention senses the change of the capacitance between the first electrode 10 and the second electrode 20, thereby detecting whether the touch occurs on the touch sensor panel 100 or not, the touch position and/or the magnitude of the touch pressure.

As shown in FIG. 4a, the first electrode 10 and the second electrode 20 may be arranged to cross each other. The first electrode 10 may include a plurality of first electrodes 11, 12, 13, and 14 which extend in the first axial direction. The second electrode 20 may include a plurality of second electrodes 21, 22, 23, and 24 which extend in the second axial direction crossing the first axial direction. Hereinafter, for convenience of description, the plurality of first electrodes 11, 12, 13, and 14 may be commonly designated as the first electrode 10. Similarly, the plurality of second electrodes 21, 22, 23, and 24 may be commonly designated as the second electrode 20.

Though FIG. 4a and the following figures show that the first axis and the second axis are orthogonal to each other, this is just an example. It is enough as long as the first axis and the second axis cross each other, and the first axis and the second axis are not necessarily orthogonal to each other. Hereinafter, for convenience of description, FIG. 4a will be divided into the top, bottom, right and left parts.

Here, a predetermined capacitance (indicated by a reference number of 101 in FIG. 1), that is, a value of a capacitance, is generated at each crossing of the first electrode 10 and the second electrode 20. When a part of a body approaches the crossing, the value of the capacitance may be changed.

In the first embodiment of the present invention, the first electrode 10 may be a driving line to which the drive signal is applied, and the second electrode 20 may be a receiving line which receives a drive signal coupled by the capacitance 101 between the first electrode 10 and the second electrode 20. The capacitance between the first electrode 10 and the second electrode 20 may change by the touch of a part of a body, etc. The touch input device 1000 senses such a change of the electrical characteristic, thereby detecting whether the body touch occurs or not and/or the position of the touch. In other words, in the 2-dimensional plane consisting of the first axis and the second axis, it is possible to detect whether or not the touch occurs on the touch sensor panel 100 and/or the position of the touch.

Figure 4B:
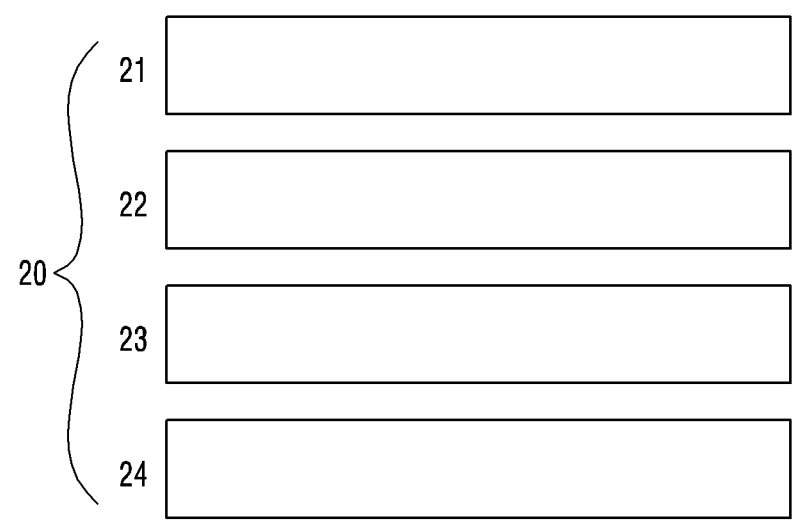

FIG. 4b shows separately the pattern of the first electrode shown in FIG. 4a. As shown in FIG. 4b, the pattern of the first electrode 10 according to the first embodiment of the present invention may include the plurality of first electrodes 11, 12, 13, and 14 which extend in the first axial direction. Although only four first electrodes 11, 12, 13, and 14 are shown in the drawing, it is apparent that another number of the first electrodes can be included. Here, when the touch occurs on the touch sensor panel 100, a signal from the first electrodes 11, 12, 13, and 14 is detected, and thus, the second axial direction position of the touch can be detected.

The width of each of the first electrodes 10 may be greater than that of the second electrode 20. This intends to block the capacitance change caused by a voltage used to drive a display like a liquid crystal display (LCD) which is generally provided on one side of the first electrode 10 opposite to the second electrode 20. For example, the first electrode 10 may function as a shielding layer.

Figure 4C:
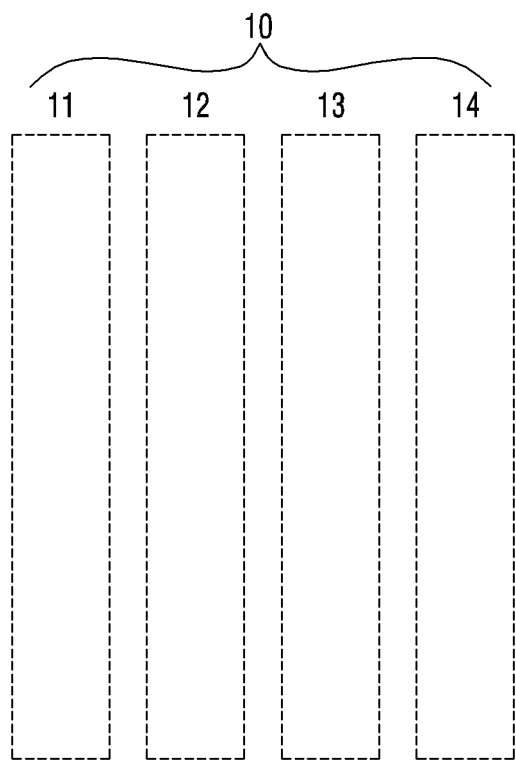

FIG. 4c shows separately the pattern of the second electrode shown in FIG. 4a. As shown in FIG. 4c, the pattern of the second electrode 20 according to the first embodiment of the present invention may include the plurality of second electrodes 21, 22, 23, and 24 which extend in the second axial direction. Although only four second electrodes 21, 22, 23, and 24 are shown in the drawing, it is apparent that another number of the second electrodes can be included. Here, when the touch occurs on the touch sensor panel, a signal from the second electrodes 21, 22, 23, and 24 is detected, and thus, the first axial direction position of the touch can be detected.

In the foregoing, it has been described that whether or not the touch occurs on the touch sensor panel according to the first embodiment of the present invention and/or the touch position are detected. Additionally, as described above, the touch sensor panel according to the first embodiment of the present invention is able to detect the magnitude of the touch pressure together with or separately from whether the touch has occurred or not and/or the touch position. Hereinafter, a principle of detecting the magnitude of the pressure of the touch on the touch sensor panel according to the first embodiment of the present invention will be described.

Figure 4D:
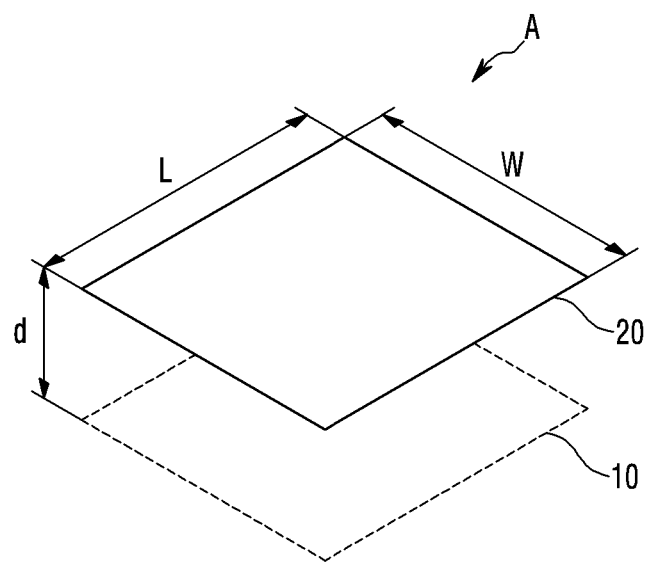

FIG. 4d is an enlarged view of a part "A" of FIG. 4a. The part "A" of FIG. 4a means one of overlapping areas of the first electrode 10 and the second electrode 20. In FIG. 4d, the width of the part "A" is represented by "W", and the length width of the part "A" is represented by "L". A length by which the first electrode 10 is spaced apart from the second electrode 20 is represented by a height "d" for convenience. Here, in the part "A", a mutual capacitance C between the first electrode 10 and the second electrode 20 may be calculated as $C = \varepsilon_o \varepsilon_r WL/d$. Here, "$\varepsilon_o$" represents a vacuum permittivity, and "$\varepsilon_r$" represents a relative permittivity of a material filled between the first electrode 10 and the second electrode 20.

When it is assumed that "W" and "L" are 4 mm and "d" is 0.15 mm and "$\varepsilon_r$" is 4, the mutual capacitance between the first electrode 10 and the second electrode 20 is calculated as about 3.73 pF. Here, when "d" is decreased by 0.1 mm due to the application of the pressure to the touch sensor panel, the mutual capacitance between the first electrode 10 and the second electrode 20 is increased by 5.6 pF.

Therefore, the change amount of the capacitance between the first electrode 10 and the second electrode 20 is measured at the time of touching the touch sensor panel according to the first embodiment of the present invention, so that the magnitude of the touch pressure can be detected through the change of the distance between the first electrode 10 and the second electrode 20.

Here, a base mutual capacitance between the first electrode 10 and the second electrode 20 and/or a change rate of the mutual capacitance between the first electrode 10 and the second electrode 20 can be controlled by changing the thickness of the spacer layer 30, a medium filling the spacer layer 30, the degree of elasticity of the medium, and the patterns of the first electrode 10 and/or the second electrode 20. The base mutual capacitance corresponds to a mutual capacitance between the first electrode 10 and the second electrode 20 when no touch occurs on the touch sensor panel.

Figure 5A:
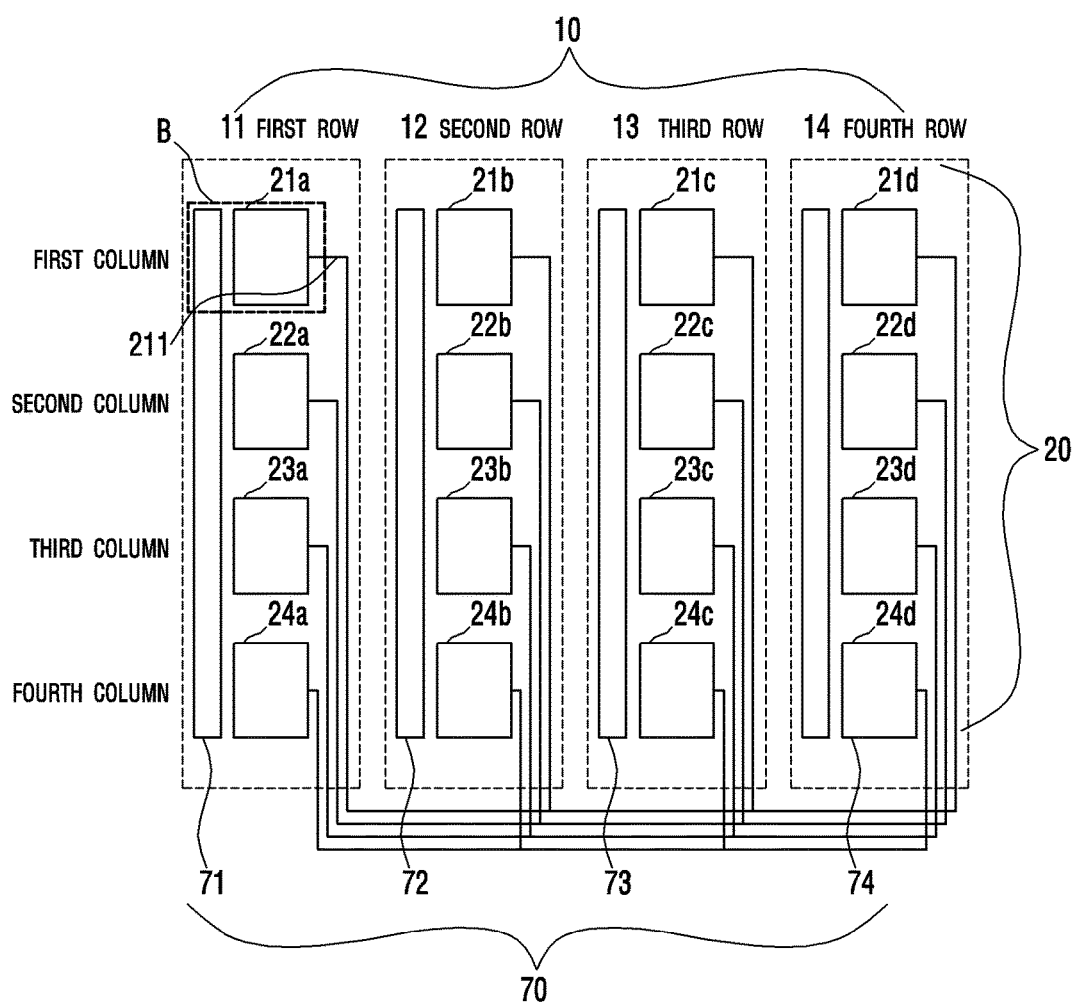
FIG. 5a shows patterns of a first electrode, a second electrode and a third electrode of a touch sensor panel according to a second embodiment of the present invention.

FIG. 5a shows patterns of a first electrode, a second electrode and a third electrode of a touch sensor panel according to a second embodiment of the present invention. Here, the second electrode 20 and a third electrode 70 may be on the same plane in the second insulation layer 20a. In the touch sensor panel according to the second embodiment of the present invention, the first electrode 10 and the second electrode 20 are configured to sense the magnitude of the touch on the touch sensor panel, and the second electrode 20 and the third electrode 70 are configured to detect the position of the touch on the touch sensor panel. The second embodiment of the present invention is remarkably similar to the first embodiment of the present invention. Hereinafter, therefore, the following description will focus on the differences between the two embodiments.

The pattern shown in FIG. 4b may be applied to the first electrode 10. However, only in relation to the second electrode 20, the first electrode 10 of the second embodiment of the present invention may be configured to be used to detect the magnitude of the touch pressure by detecting the change of the capacitance between the first electrode 10 and the second electrode 20. In the second embodiment, during the period of time when the second electrode 20 and the third electrode 70 detect whether the touch occurs on the touch sensor panel or not and/or the touch position, a ground voltage is applied to the first electrode 10. As a result, the first electrode 10 is still able to function as a shielding layer.

In FIG. 5a, the first electrode 10 may still function as a drive electrode in the detection of the magnitude of the pressure, and the second electrode 20 may function as a receiving electrode in the detection of the magnitude of the pressure. In the detection of the touch position, the third electrode 70 may function as a drive electrode, and the second electrode 20 may still function as a receiving electrode. In this case, the touch detection device performs time-sharing, and then applies a drive signal to the first electrode 10 and receives a receiving signal from the second electrode 20 in a first time interval. Thus, the touch detection device can detect the magnitude of the touch pressure. The touch detection device applies a drive signal to the third electrode 70 and receives a receiving signal from the second electrode 20 in a second time interval different from the first time interval, and thus, can detect the touch position. A ground voltage may be applied to the first electrode 10 in the second time interval.

Also, in FIG. 5a, the second electrode 20 can function as the drive electrode TX in both the detection of the magnitude of the touch pressure and the detection of the touch position. The first electrode 10 can function as a receiving electrode for detecting the magnitude of the touch pressure, and the third electrode 70 can function as a receiving electrode for detecting the touch position, respectively. Here, the touch detection device applies a drive signal to the second electrode 20 and simultaneously receives a first receiving signal from the first electrode 10, and then, detects the magnitude of the touch pressure. The touch detection device receives a second receiving signal from the third electrode 70, and then, detects the touch position. Even in such a case, the touch detection device performs time-sharing, and then receives the first sensing signal from the first electrode 10 in the first time interval, thereby detecting the magnitude of the touch pressure, and receives the second sensing signal from the third electrode 70 in the second time interval different from the first time interval, thereby detecting the touch position.

Figure 5B:
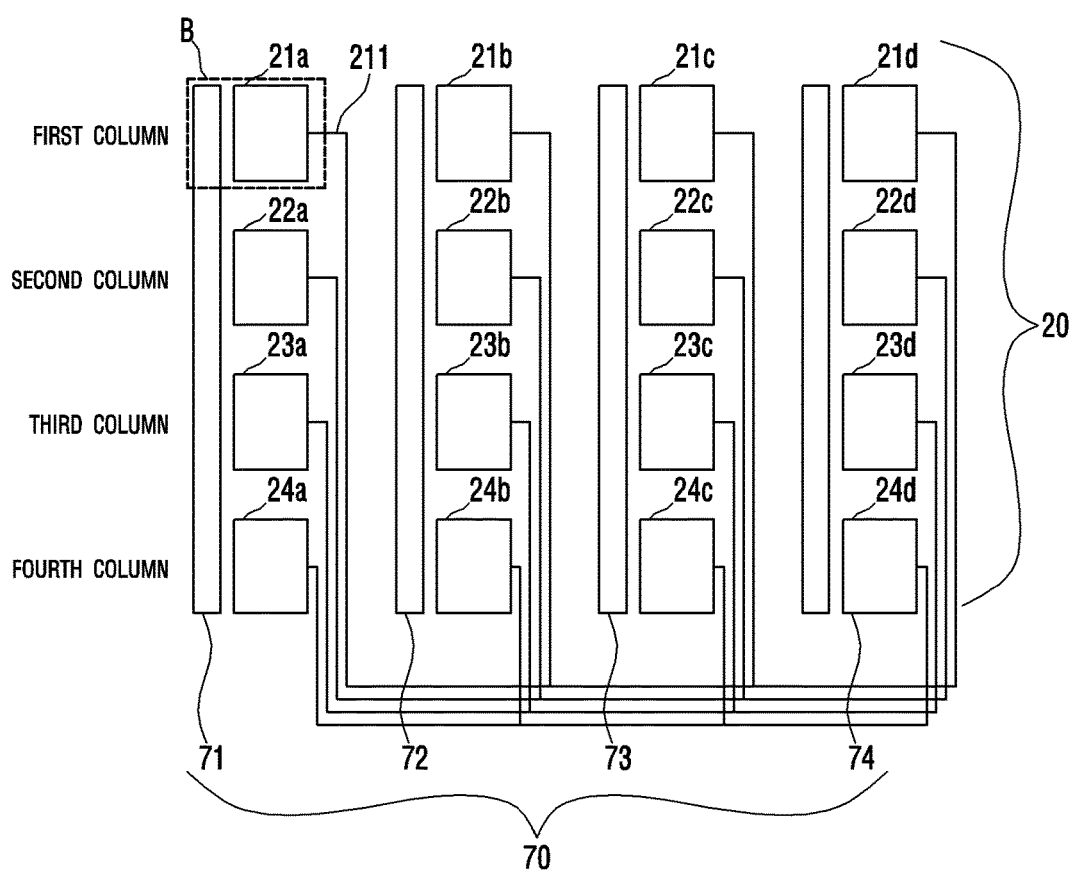

FIG. 5b shows separately the patterns of the second and third electrodes shown in FIG. 5a. As shown in FIG. 5b, a touch detection area including a plurality of sensing areas "B" arranged in a matrix consisting of M number of columns extending in the second axial direction and N number of rows extending in the first axial direction (M×N, M and N are natural numbers) may be included. While FIGS. 5a and 5b show that only four columns and four rows are included, this is just an example. Any number of rows and columns may be included.

Hereinafter, a case where the third electrode 70 is a drive electrode and the second electrode 20 is a receiving electrode will be taken as an example in the detection of the touch position.

Here, each of the plurality of sensing areas "B" includes a second electrode 21a and the third electrode 71 which are mutually exclusive. The third electrode 71 may be located on one side in the second axial direction relatively with respect to the second electrode 21a within the sensing area "B". The second electrode 21a may be located on the other side in the second axial direction. FIG. 5b shows that the second electrode 21a is located on the right side of the sensing area "B" and the third electrode 71 is located on the left side of the sensing area "B".

FIG. 5b shows that the shapes of all of the patterns in the sensing area "B" are the same as each other. The third electrode 70 extends in the form of a bar in the same row in the first axial direction. Therefore, when the touch occurs on the touch sensor panel, the touch position in the second axial direction can be detected by processing the signal from the third electrode 70.

It can be seen that the second electrode 20 has a divided quadrangular pattern for each sensing area "B". However, each divided second electrode 21a included in the sensing area "B" is connected to a conductive trace 211. Here, as shown in FIG. 5b, it can be understood that the divided second electrodes 21a, 21b, 21c, and 21d included in the same column are electrically connected to each other through the conductive trace. It can be found that the divided second electrodes 21a, 22a, 23a, and 24a included in the different columns are electrically insulated from each other. Therefore, when the touch occurs on the touch sensor panel, the touch position in the first axial direction can be detected by processing the signal from the second electrode 20.

Figure 5C:
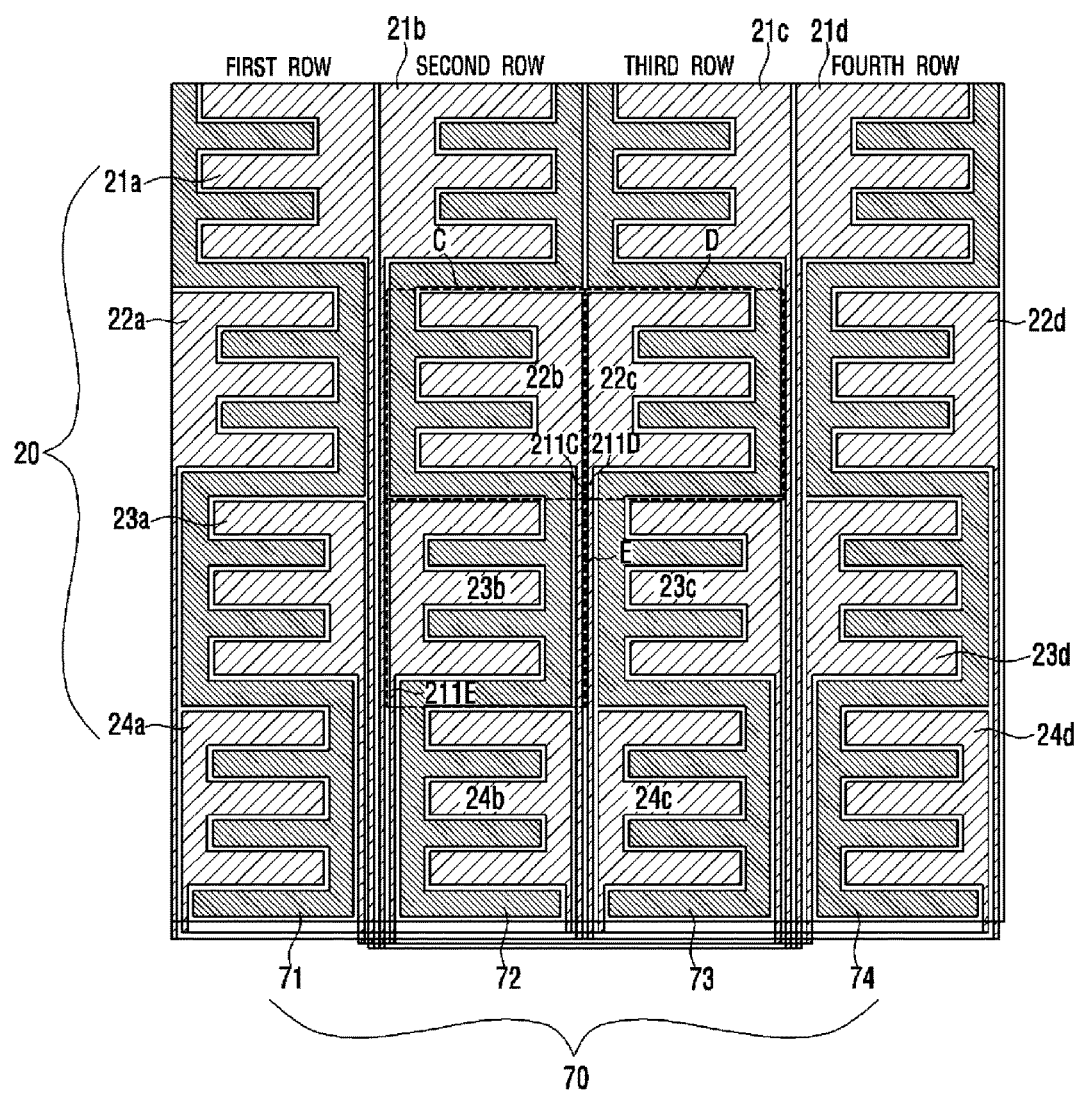
FIG. 5c shows patterns of a first electrode, a second electrode and a third electrode of a touch sensor panel according to a third embodiment of the present invention.

FIG. 5c shows patterns of a first electrode, a second electrode and a third electrode of a touch sensor panel according to a third embodiment of the present invention. The third embodiment of the present invention is remarkably similar to the second embodiment of the present invention. Only the patterns of the second and third electrodes show difference. Hereinafter, therefore, the following description will focus on the differences between the third embodiment and the second embodiment.

As shown in FIG. 5c, a touch detection area including a plurality of sensing areas "C", "D", and "E" arranged in a matrix consisting of M number of columns extending in the second axial direction and N number of rows extending in the first axial direction (M×N, M and N are natural numbers) may be included.

In the third embodiment of the present invention, each of the plurality of sensing areas "C", "D", and "E" includes the third electrodes 72 and 73 and the second electrodes 22b, 22c, and 23b which are mutually exclusive. In at least one sensing area "C" among the plurality of the sensing areas, the third electrode 72 may be located on one side in the first axial direction relatively with respect to the second electrode 22b, and the second electrode may be located on the other side. In at least another one sensing area "E" located in the same row as that of the at least one sensing area "C" among the plurality of the sensing areas, the third electrode 72 may be located on the other side in the first axial direction relatively with respect to the second electrode 23b, and the second electrode 23b may be located on the one side. In the above description, the one side may represent the left side of FIG. 5c, and the other side may represent the right side of FIG. 5c.

In the third embodiment of the present invention, the adjacent sensing area "E" located in the same row (the second row) as that of any one sensing area "C" among the plurality of sensing areas "C", "D", and "E" has a shape inverted with respect to the one sensing area "C" on the basis of a second axial direction center line C1 of the one sensing area "C". Here, the center line C1 is a straight line which extends from the second axial direction center inside the sensing area "C" in the first axial direction. The relationships between the shapes of the sensing areas "C", "D", and "E" can be applied to all of the two adjacent sensing areas in the same row.

One end of the third electrode 72 of the one sensing area "C" may extend to one end of the third electrode 72 of the adjacent sensing area "E". Consequently, as shown in FIG. 5c, in the touch sensor panel according to the third embodiment of the present invention, it is discovered that that the third electrode 72 extends in zigzags from the top to the bottom in the same row. That is, the first electrodes of the plurality of sensing areas included in the first row extend in zigzags and connected to each other. This is applied in the same manner to the second to fourth rows. The third electrodes included in each row are connected to each other. The third electrodes included in mutually different rows are not electrically connected to each other.

As a result, when the touch occurs on the touch sensor panel, the second axial direction position of the touch can be detected by detecting the signal from the third electrode.

In the third embodiment of the present invention, the sensing areas "C" and "D" included in two adjacent rows among the N number of rows may have a symmetrical shape with respect to the first axial direction center line between the two rows (the second row and the third row). For example, the sensing area "C" and the sensing area "D" are located in the second row and the third row respectively. The positions and shapes of the third electrode 73 and the second electrode 22c in the sensing area "D" are symmetrical to the positions and shapes of the third electrode 72 and the second electrode 22b in the sensing area "D" with respect to the center line between the sensing area "C" and the sensing area "D". Here, the first axial direction center line between the two rows is a straight line which extends between the second row and the third row in the first axial direction. The relationships between the shapes of the sensing areas can be applied to all of the two adjacent sensing areas in the adjacent row.

Figure 5D:
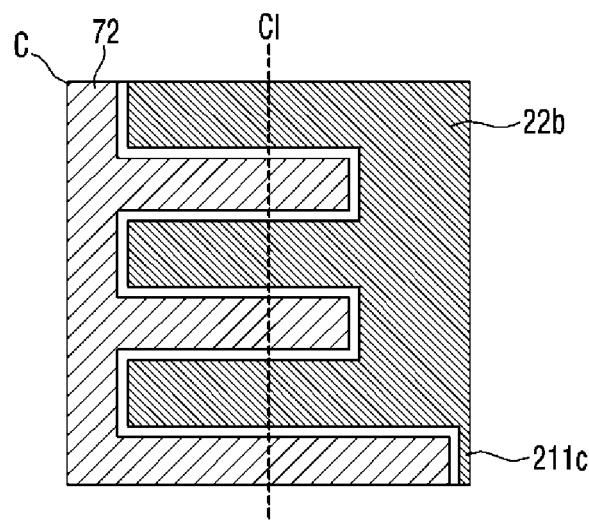
FIG. 5d is an enlarged view of a part "C" of FIG. 5c.

As shown in FIGS. 5c and 5d, the second electrodes 22b, 22c, and 23b are connected to the conductive traces 211C, 211D, and 211E in the sensing areas "C", "D", and "E" respectively. Here, as shown in FIG. 5c, it can be understood that the divided second electrodes 22a, 22b, 22c, and 22d included in the same column are electrically connected to each other through the conductive trace. It can be found that the divided second electrodes 21a, 22a, 23a, and 24a included in the different columns are electrically insulated from each other. Therefore, when the touch occurs on the touch sensor panel, the touch position in the first axial direction can be detected by processing the signal from the second electrode 20.

FIGS. 5a to 5d show the electrode pattern for the embodiment in which the touch sensor panel 100 further includes the third electrode 70 located in the same layer as the layer in which the second electrode 20 is located. However, this is just an example. Together with the pattern shown in FIGS. 5a to 5d, so long as the third electrode 70 and the second electrode 20 are located in the same layer, and then the position of the touch on the touch sensor panel 100 can be detected and the magnitude of the touch pressure can be detected by the first and second electrodes 10 and 20, any pattern may be used.

Figure 6:
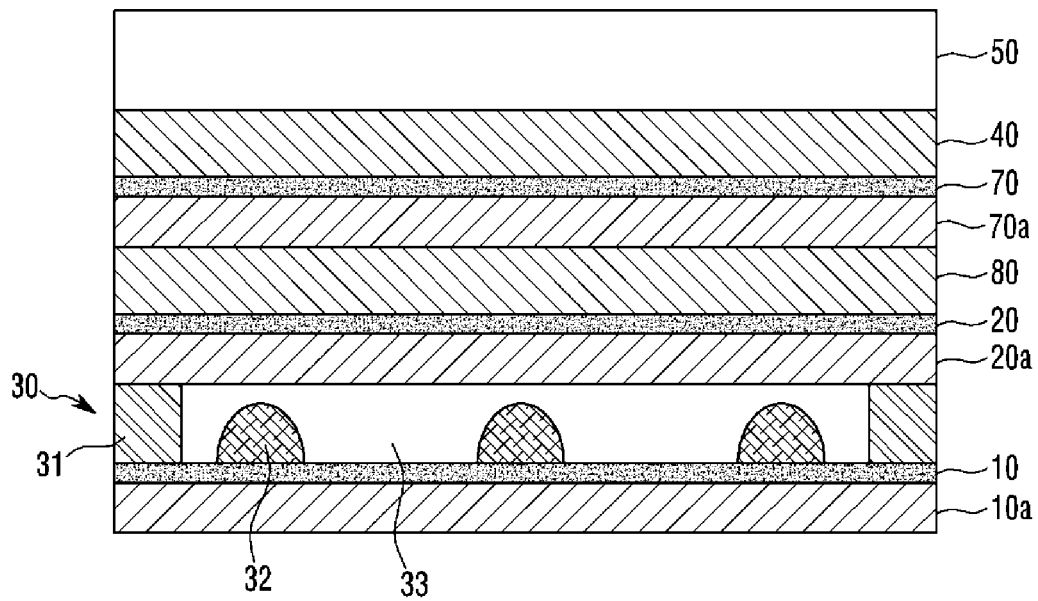
FIG. 6 is a schematic view of a capacitive touch sensor panel according to the second embodiment of the present invention.

FIG. 6 is a schematic view of a capacitive touch sensor panel according to the second embodiment of the present invention. The capacitive touch sensor panel according to the second embodiment shown in FIG. 6 is different from the touch sensor panel according to the first embodiment shown in FIG. 2 in that the capacitive touch sensor panel according to the second embodiment further includes a third insulation layer 70a and the third electrode 70 is formed on the third insulation layer 70a. Here, the third insulation layer 70a may be adhered to the second electrode 20 by means of an additional adhesive layer 80.

In the second embodiment of the present invention, the magnitude of the pressure of the touch on the touch sensor panel can be detected by detecting the change of the capacitance change between the first electrode 10 and the second electrode 20. Also, it is possible to detect the position of the touch on the plane consisting of the first axis and the second axis of the touch sensor panel by detecting the change of the capacitance change between the first electrode 10 and the second electrode 20.

The third electrode 70 of the touch sensor panel according to the second embodiment of the present invention performs the same function as that of the third electrode 70 of the foregoing second and third embodiments described in FIGS. 5a to 5d of the present invention. However, in the second embodiment of the present invention, the third electrode 70 and the second electrode 20 are formed in different layers. Hereinafter, repetitive descriptions thereof will be omitted.

Figure 7A:
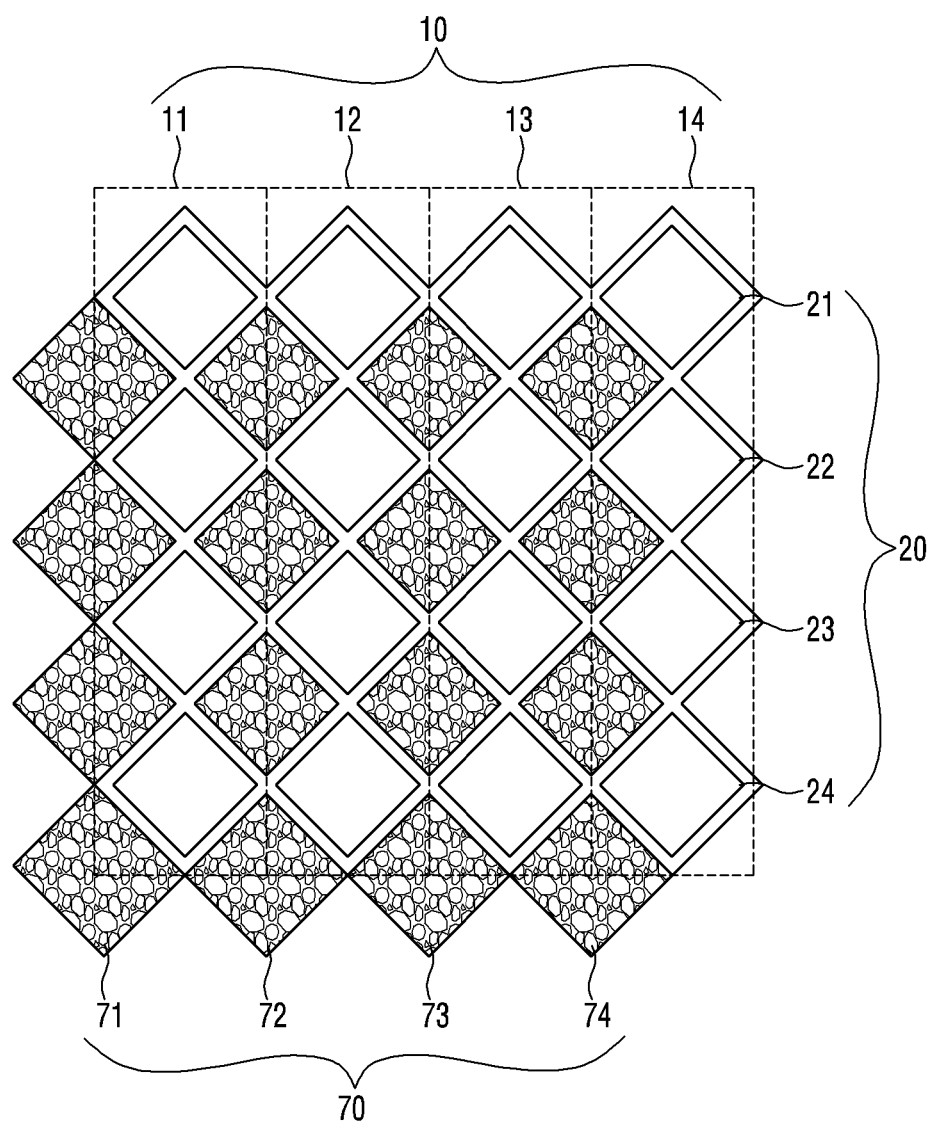
FIG. 7a shows patterns of a first electrode, a second electrode and a third electrode of a touch sensor panel according to a fourth embodiment of the present invention.

FIG. 7a shows the patterns of the first electrode, the second electrode and the third electrode of the touch sensor panel according to the fourth embodiment of the present invention. In FIG. 7a, the first electrode 10, the second electrode 20, and the third electrode 70 may be implemented in different layers.

Figure 7B:
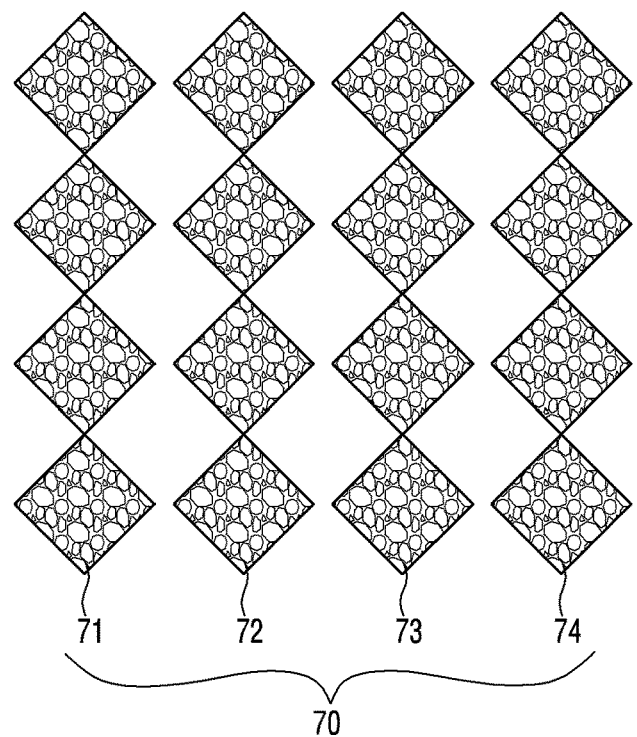

FIG. 7b shows separately the pattern of the second electrode of FIG. 7a. The second electrode 20 may include, as shown in FIG. 4b, the plurality of second electrodes 21, 22, 23, and 24 which extend in the second axial direction. In FIGS. 7a and 7b, each of the plurality of second electrodes 21, 22, 23, and 24 has a rhombus shape, and the plurality of rhombus shapes are connected to each other in the second axial direction. This is just an example. It is apparent that the second electrode 20 shown in FIG. 4b can be applied. Here, the plurality of rhombus shapes should be insulated from each other in the first axial direction.

Figure 7C:
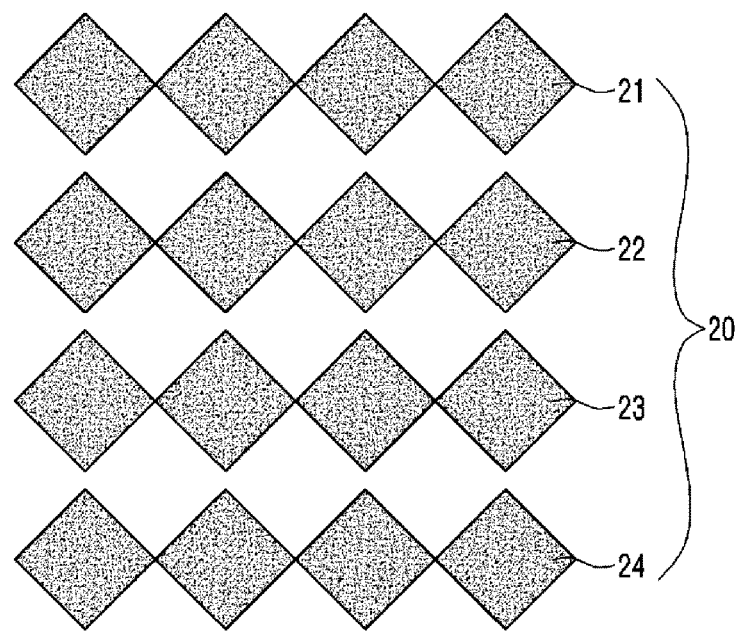

FIG. 7c shows separately the pattern of the third electrode of FIG. 7a. The third electrode 70 may include the plurality of third electrodes 71, 72, 73, and 74 which extend in the first axial direction. In FIGS. 7a and 7c, each of the plurality of third electrodes 71, 72, 73, and 74 has a rhombus shape, and the plurality of rhombus shapes are connected to each other in the first axial direction. This is just an example. The pattern of the first electrode 10 shown in FIG. 4c can be applied. Here, the plurality of rhombus shapes should be insulated from each other in the second axial direction.

The forms of the patterns of the first, second, and third electrodes described above are just examples. Therefore, it is apparent that various forms of the patterns of the first, second, and third electrodes can be applied within the scope of the present invention.

With reference to FIGS. 2 to 4d, the foregoing has described the embodiment in which the first electrode 10 and the second electrode 20 are formed in different layers and are used to detect the position of the touch on the touch sensor panel and/or the magnitude of the touch pressure.

With reference to FIGS. 5a to 5d, the foregoing has described the embodiment in which the first electrode 10 and the second electrode 20 are formed in different layers and are configured to detect the magnitude of the touch pressure, and the third electrode 70 located in the same layer as the layer in which the second electrode 20 is located detects the position of the touch on the touch sensor panel.

Also, with reference to FIGS. 6 to 7c, the foregoing has described the embodiment in which the first electrode 10 and the second electrode 20 are formed in different layers and are configured to detect the magnitude of the touch pressure, and the third electrode 70 formed in a layer different from the layer in which the second electrode 20 is formed detects the position of the touch on the touch sensor panel.

That is, the present specification has described the embodiment in which at least one electrode 10 or 20 is commonly used to detect the position of the touch and the magnitude of the touch pressure.

Though not shown in the drawings, a touch sensor panel according to a fifth embodiment of the present invention may include the first electrode 10 and the second electrode 20 which are, as shown in FIG. 2, formed in different layers and detect the magnitude of the touch pressure; and the third electrode 70 and a fourth electrode (not shown) which detect the position of the touch. In other words, in the touch sensor panel according to the fifth embodiment of the present invention, the two electrodes (first electrode and second electrode) which detect the magnitude of the touch pressure and the two electrode (third electrode and fourth electrode) which detect the position of the touch may be formed separately from each other.

In the touch sensor panel according to the fifth embodiment of the present invention, all of the first electrode 10 to the fourth electrode (not shown) may be formed in different layers. For example, in FIG. 6, the fourth electrode (not shown) formed on an additional insulation layer (not shown) may be further included between the third 70 and the adhesive layer 40.

In the touch sensor panel according to the fifth embodiment of the present invention, it is also possible that the first electrode 10 to the third electrode 70 are formed in different layers, and the third electrode 70 and the fourth electrode are formed in the same layer.

In the fifth embodiment of the present invention, since the third electrode 70 and the fourth electrode which detect the position of the touch perform their functions independently of the first electrode 10 and the second electrode 20, the third electrode 70 and the fourth electrode (not shown) may be configured independently of the first electrode 10 and the second electrode 20. For example, even when the first electrode 10 and the second electrode 20 cross each other in the first axial direction and the second axial direction, the third electrode 70 and the fourth electrode do not necessarily cross each other in the first axial direction and the second axial direction. If the third electrode 70 and the fourth electrode are on the same plane consisting of the first axis and the second axis, they may extend in any axial direction in which they cross each other. According to the embodiment, the third electrode 70 may extend in one of the first and second axial directions, and the fourth electrode may extend in the other of the first and second axial directions.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

INDUSTRIAL APPLICABILITY

According to the embodiment of the present invention, it is possible to provide a touch sensor panel capable of sensing not only a touch on a surface of the touch sensor panel and a position of the touch but also a magnitude of a pressure of the touch, a touch detection device for the same, and a touch input device including the both.

Also, according to the embodiment of the present invention, it is possible to provide a touch sensor panel capable of sensing not only a touch on the touch sensor panel and a position of the touch but also a magnitude of a pressure of the touch by sensing capacitance change, a touch detection device for the same, and a touch input device including the both.

The invention claimed is:

1. A touch sensor comprising:
a first electrode;
a second electrode;
a spacer layer located between the first electrode and the second electrode; and
a second insulation layer located on one side of the second electrode;
wherein at least one of the first electrode and the second electrode comprises a plurality of electrodes;
wherein one of the first electrode and the second electrode is a drive electrode to which a drive signal is applied;
wherein the other one of the first electrode and the second electrode is a receiving electrode that receives the drive signal by a mutual capacitance between the first electrode and the second electrode;
wherein the spacer layer is formed by a support member disposed on edge portions of a layer on which the second electrode is disposed;
wherein the first electrode and the second insulation layer are overlapped with each other;
wherein the first electrode and the second insulation layer are spaced apart from each other by a predetermined distance at rest portions of the layer on which the second electrode is disposed;
wherein when no external pressure is applied to the first electrode through a display, the predetermined distance is maintained only by the support member;
wherein when an external pressure is applied to the first electrode through the display provided on one side of the first electrode opposite to the second electrode, the first electrode is concavely bent toward the second electrode in response to the external pressure;
wherein the mutual capacitance between the first electrode and the second electrode changes according to a distance between the first electrode and the second electrode; and
wherein the magnitude of the external pressure according to the change of the capacitance between the first electrode and the second electrode is detected.

2. The touch sensor of claim 1 further comprising a fourth insulation layer located on the other side of the second electrode opposite to the second insulation layer.

3. The touch sensor of claim 2 wherein at least one of the second insulation layer and the fourth insulation layer is made of polyethylene terephthalate.

4. The touch sensor of claim 1 further comprising a first insulation layer, wherein the first electrode is formed on the first insulation layer.

5. The touch sensor of claim 4:
- wherein the first electrode comprises a plurality of electrodes extend in a first axial direction; and
- wherein the second electrode comprises a plurality of electrodes extend in a second axial direction crossing the first axial direction.

6. The touch sensor of claim 4 wherein the first insulation layer is made of polyethylene terephthalate.

7. The touch sensor of claim 1 wherein the first electrode is made of indium tin oxide.

8. The touch sensor of claim 1 wherein the width of the first electrode is greater than the width of the second electrode.

9. The touch sensor of claim 1 wherein the mutual capacitance between the first electrode and the second electrode is calculated in the overlapping area of the first electrode and the second electrode.

10. The touch sensor of claim 1 wherein the spacer layer is air.

11. The touch sensor of claim 1 wherein the spacer layer is foam, gel or polymer.

12. The touch sensor of claim 1 wherein the spacer layer is an adhesive material.

\* \* \* \* \*